G. L. MEYFARTH.
CONTROL OF ELECTROMAGNETIC TRACK BRAKE SYSTEMS.
APPLICATION FILED SEPT. 18, 1919.

1,399,361. Patented Dec. 6, 1921.

INVENTOR.
Gottlieb L. Meyfarth.

By Lawrence Langner
Attorney.

UNITED STATES PATENT OFFICE.

GOTTLIEB L. MEYFARTH, OF GENEVA, SWITZERLAND.

CONTROL OF ELECTROMAGNETIC TRACK-BRAKE SYSTEMS.

1,399,361.  Specification of Letters Patent.  Patented Dec. 6, 1921.

Application filed September 18, 1919. Serial No. 324,678.

*To all whom it may concern:*

Be it known that I, GOTTLIEB L. MEY-FARTH, a citizen of the Swiss Republic, and resident of Geneva, Switzerland, have invented new and useful Improvements in the Control of Electromagnetic Track-Brake Systems, of which the following is a full, clear, and exact specification.

This invention relates to electro-magnetic braking apparatus for electrically propelled railway and tramway vehicles of the kind comprising track brakes arranged to be supplied with energizing current from the vehicle motors acting as generators with or without an additional supply of braking current from the propulsion circuit, this additional supply of current serving to energize the track brakes through the circuits of the motors in the event of the latter becoming inoperative due to skidding or locking of the driving wheels.

Systems of connection for electro-magnetic track brakes of the above character have previously been proposed in which the direction of the flow of magnetizing current in the track brake windings and in the motor field windings remains unchanged when the braking is changed from short-circuit braking of the motors acting as generators and connected in series with the track brakes to a braking with additional supply circuit current.

In this method of connection an additional resistance has previously been employed which during short-circuit braking as well as during the braking with additional supply circuit current remains permanently connected in the short circuit. This arrangement has, however, the objection that in short-circuit braking a complete short-circuit can never be effected. Moreover the additional resistance must be proportioned both for the generator current during the short-circuit braking period and for the supply circuit additional current during the supply circuit current braking period, that is to say the resistance must be of correspondingly ample capacity.

The present invention has for its object to provide a method of connection for electro-magnetic track brakes of the character above described in which these disadvantages are avoided. This is accomplished according to the present invention by so arranging the system of connection that during the short-circuit braking period, the starting resistance only in the short-circuited generator circuit is connected in series with the track brakes so that a complete short-circuit braking effect can eventually be obtained as a result of gradually excluding portions of the starting resistance from the circuit, whereas in changing over (without interruption of the short-circuit) to supply circuit current braking in addition to the short-circuit braking and during the duration of this braking an additional resistance is connected in the short-circuit, this additional resistance being connected in series with the starting resistance between the supply circuit line and earth.

The invention is illustrated in the accompanying drawings, Figures 1 to 6 of which are diagrams of connections illustrating two forms of the invention by way of example.

Figure 1:
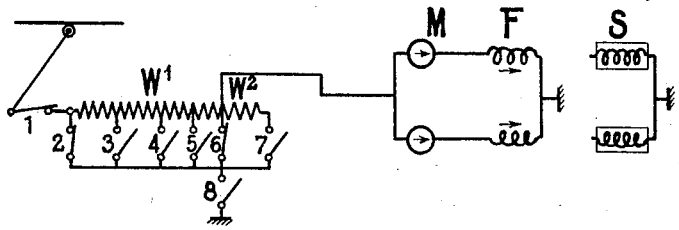
Fig. 1 shows the normal running connection, Fig. 2 the short-circuit braking connection and Fig. 3 the supply circuit braking connection for one form of arrangement.
Figure 2:
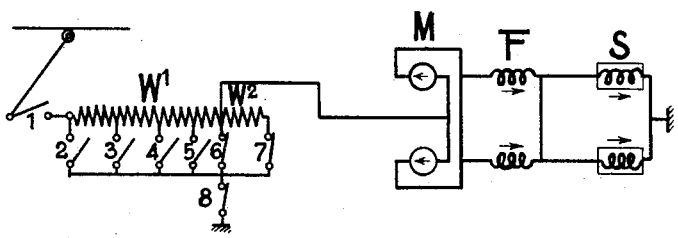
Figure 3:
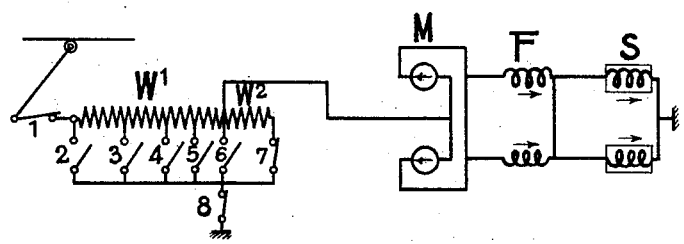

Referring now firstly to the form shown in Figs. 1 to 3 inclusive,

Fig. 1 illustrates the normal running connections of a two-motor equipment on an electrically driven vehicle, the motors M being in parallel with one another and the starting resistance $W^1$ being short-circuited at the switch contacts 2 and 6. The motor fields F are as is usual connected to earth.

Fig. 2 illustrates the short-circuit braking of the motors acting as generators with series connected track brakes S. The supply circuit (indicated as an overhead trolley line) is disconnected at the switch contact 1, and the switch contact 8 is closed, this contact as well as one of the terminals of the track brakes S being connected to earth. In the first stage of short-circuit braking the switch contact 2 is closed while the switch contacts 6 and 7 are open so that the entire starting resistance $W^1$ is connected in the generator circuit. By closing successively the switch contacts 3, 4, 5 and 6 the starting resistance $W^1$ can be gradually completely cut out of circuit and after closure of the switch contact 6, the switch contact 7 may also be closed. The final stage of the short-circuit braking gives the following circuit: from earth through switch contacts 8, 6, motor armatures M, motor fields F, track brake windings S to earth. In this connection an additional resistance $W^2$ is connected in parallel with the switch contact 6 by means of the closed switch contact 7.

Fig. 3 illustrates the method of connection for an emergency application of the brakes in which in addition to the current obtained from the motors acting as generators an additional supply of current from the propulsion circuit is obtained, this emergency braking being utilized when owing to the skidding or locking of the driving axles of the vehicle the motors cannot be relied upon to act effectively as generators. The switch contact 6 is first opened and the trolley line is connected to earth through the switch contact 1, the starting resistance $W^1$, the windings M and F and the track brake windings S, a parallel circuit to the above being through the additional resistance $W^2$ and the switch contacts 7 and 8 to earth. In these circumstances the additional resistance $W^2$ serves to limit the short-circuit current generated by the motors and passing through the brake magnets.

Figure 4:
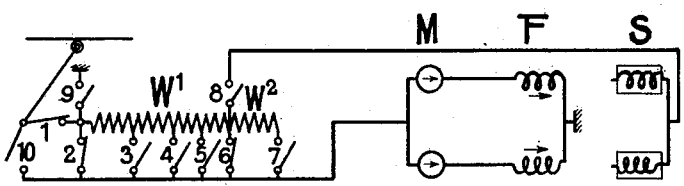
Figs. 4, 5 and 6 show respectively the analogous connections for the second embodiment.
Figure 5:
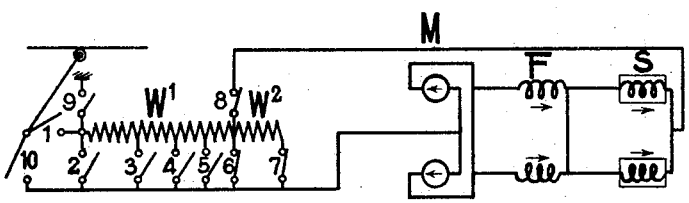
Figure 6:
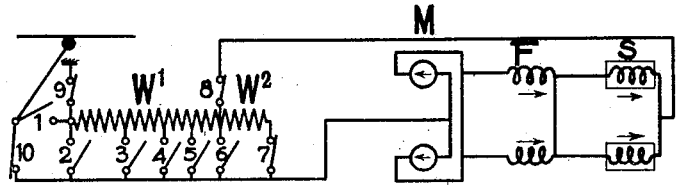

Figs. 4 to 6 inclusive show another method of connection which achieves the same object as that of Figs. 1 to 3. The modification in this arrangement consists in that in the braking positions the track brakes S are not connected to earth in series with motor windings, but are connected to the starting resistance $W^1$. In the supply circuit current braking connection the trolley line is connected to earth through two parallel current circuits, constituted by the motors and track brakes and by the additional resistance $W^2$ respectively, both circuits being in series with the starting resistance $W^1$.

In Fig. 4 the normal running connections are shown for parallel operation of the motors M, starting resistance $W^1$ being indicated as short-circuited at the switch contacts 2 and 6. In this case the track brake magnets S may be connected directly to earth for supply circuit braking only by closing the switches 8, 6 and 10 as will be readily understood. Fig. 5 shows the short-circuit braking connections. With the switch contacts 2 and 8 closed while the contacts 6 and 7 are open the entire starting resistance $W^1$ is connected in series in the generator circuit with the track brakes S. By successively closing the switch contacts 3, 4, 5 and 6 the starting resistance $W^1$ can be entirely cut out of circuit. In the final short-circuit braking position the additional resistance $W^2$ is simultaneously connected in parallel with the switch contact 6 through the switch contact 7.

When changing over to the combined short-circuit and additional supply circuit current braking, the connections are as shown in Fig. 6, the switch contact 6 is first opened and the trolley line is then connected by switch contact 10 to the motors and the additional resistance $W^2$, the terminal end of the starting resistance $W^1$ being connected to earth through the switch contact 9. The different switch contacts are arranged in the usual manner on a rotary controller and it is not necessary to describe a specific construction thereof as it may be of any known kind.

What I claim is:

1. A method of controlling electro-magnetic track brakes on electrically propelled railway and tramway vehicles of the kind wherein the track brakes are adapted to be operated by current supplied from the vehicle motors acting as generators with or without an additional supply of current from the propulsion circuit, which method consists in including, during the short-circuit braking, the usual motor starting resistance only in the motor short-circuit in series with the track brakes, while, on changing over to short-circuit braking with additional supply circuit current, an additional resistance is connected in the closed motor and track brake circuit and put in series with the starting resistance between the supply circuit conductor and earth, substantially as and for the purpose described.

2. A method for controlling electro-magnetic track brakes on electrically propelled railway and tramway vehicles of the kind wherein the track brakes are adapted to be operated by current supplied from the vehicle motors acting as generators with or without an additional supply of current from the propulsion circuit, which method consists in including, during the short-circuit braking, the usual motor starting resistance only in the motor short-circuit in series with the track brakes, while, on changing over to short-circuit braking with additional supply circuit current, an additional resistance is connected in the closed motor and track brake circuit and put in series with the starting resistance between the supply circuit conductor and earth, at the same time independently connecting the starting resistance to earth, substantially as and for the purpose described.

In witness whereof I have hereunto signed my name this second day of September, 1919, in the presence of two subscribing witnesses.

GOTTLIEB L. MEYFARTH.

Witnesses:
AMAND BRAUN,
JOSEPH SÜTTERLIN.